Dec. 24, 1968 A. G. BOSE 3,418,578

FREQUENCY MODULATION ELECTRICAL COMMUNICATION SYSTEM

Filed March 11, 1966 2 Sheets-Sheet 1

INVENTOR
AMAR G. BOSE
BY Wolf, Greenfield & Hicken
ATTORNEYS

Dec. 24, 1968 A. G. BOSE 3,418,578

FREQUENCY MODULATION ELECTRICAL COMMUNICATION SYSTEM

Filed March 11, 1966 2 Sheets-Sheet 2

INVENTOR
AMAR G. BOSE
BY Wolf, Greenfield & Hieken
ATTORNEYS

United States Patent Office 3,418,578

Patented Dec. 24, 1968

3,418,578

FREQUENCY MODULATION ELECTRICAL COMMUNICATION SYSTEM

Amar G. Bose, Chestnut Hill, Mass., assignor to Bose Corporation, a corporation of Massachusetts Filed Mar. 11, 1966, Ser. No. 533,693
12 Claims. (Cl. 325—45)

ABSTRACT OF THE DISCLOSURE

A frequency modulation system includes a transmitter and a receiver incorporating two-state modulation. In the transmitter the two-state device is characterized by hysteresis and a feedback path that carries a signal of frequency corresponding to the switching frequency of the two-state device. A signal representative of the instantaneous frequency of the two-state device is combined with a modulating signal to provide a control signal that controls one of the areas of the hysteresis loop, the gain in the feedback path or the delay furnished by the feedback path so that the frequency of the two-state device is determined by the modulating signal. The frequency of the two-state device in the receiver tracks the modulation on the received signal. Means are provided for adjusting the free-running frequency of the two-state device so that it tracks closely the instantaneous frequency of the modulation on the received signal.

The present invention relates in general to electrical communication and more particularly concerns electrical communication through frequency modulation. A system according to the invention embodies the two-state modulation techniques of A. G. Bose to faithfully reproduce at the receiving end of the system the signal waveform originating at the sending end with circuitry that minimizes alignment problems. The receiving portion of the system faithfully reproduces the modulation on a conventional frequency modulated carrier with circuitry insensitive to noise, despite the absence of conventional limiter circuits.

Frequency modulation is widely used in electrical communication for a number of reasons. Faithful correspondence between instantaneous frequency and modulating signal may be achieved by modulating at low power levels, even over a high dynamic range of modulating signal amplitude. Relatively high signal to noise ratio is readily attainable. Detecting systems may reproduce the modulated signal with high fidelity, an especially advantageous feature in connection with high fidelity music broadcasting.

Conventional frequency modulation systems suffer from a number of disadvantages. Modulation circuitry is relatively complex and often difficult to keep in alignment, especially when the deviation is high, a condition frequently encountered in wide dynamic range systems such as those used in F-M broadcasting. Receiving circuitry must be precisely aligned by a skilled technician if faithful demodulation is to be achieved. And even though such alignment is achieved, the circuitry often becomes misaligned thereafter.

It is an important object of the present invention to provide a time base modulation system capable of handling a wide dynamic range of intelligence signal amplitudes so that the receiving station faithfully reproduces the intelligence signal waveform.

It is another object of the invention to achieve the preceding object with relatively few components in circuitry that remains aligned for long periods of time.

It is a further object of the invention to achieve the preceding objects with a receiving system that is exceptionally sensitive to desired signal and highly insensitive to undesired noise.

It is an object of the invention to achieve the preceding objects with a receiving system which retains information discarded by conventional limiting to reject not only undesired amplitude modulation but also undesired time base modulation.

It is still another object of the invention to achieve the preceding objects with a lightweight compact system.

A system according to the invention embodies the two-state modulation techniques disclosed in a paper of A. G. Bose entitled, A Two-State Modulation System, in the 1963 Wescon Convention Record, for both modulation and demodulation. A two-state device according to these techniques includes an input and an output for providing one of first and second output levels on the output and shifting to the other only in response to a predetermined shift in the level on an input of the device. Means are provided for feeding back a signal from the output to the input to provide a switching signal at the input of the same frequency as the signal at the output to sustain oscillations at that frequency. Means are provided for introducing an external control signal into the oscillating loop comprising the two-state device and the means for feeding back to control the ratio of time in which the output assumes the first level to the time the output assumes the second level.

The transmitting and receiving portions of the system each includes demodulating means for providing a demodulated signal representative of the frequency modulation at the two-state device output. Preferably, the demodulating means comprises means for providing a pulse of constant duration for each output cycle and means for integrating the pulse train thus produced to provide the demodulated signal. In the transmitting portion the demodulated signal is combined with the modulating signal to provide the control signal, and the control signal establishes the frequency at the two-state device output so that it bears a linear relation to the amplitude of the modulating signal. There are a number of ways of establishing this relationship. The magnitude $w$ of the predetermined shift in level on the input of the two-state device just required to effect switching may be controlled. The magnitude $h$ of the difference between the first and second output levels on the output of the two-state device may be altered. The gain in the means for feeding back a signal from the output to the input may be controlled. The delay furnished by the means for feeding back may also be controlled. In the receiving portion the frequency modulated signal is applied to the two-state device input and locks the frequency of the signal on the two-state device output to that of the frequency modulated signal.

Numerous other features, objects and advantages of the invention will become apparent from the following specification when read in connection with the accompanying drawings in which.

Figure 1:
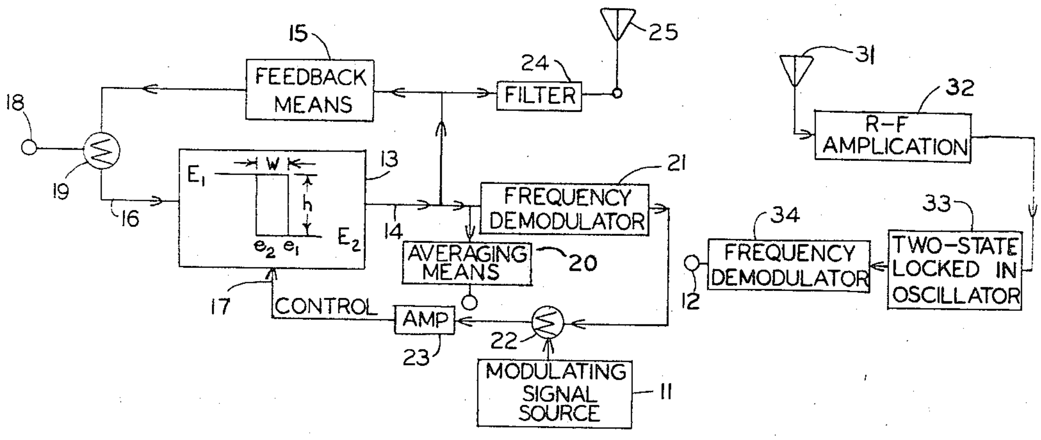
FIG. 1 is a block diagram illustrating the logical arrangement of a system according to the invention.

With reference now to the drawing and more particularly FIG. 1 thereof, there is shown a block diagram illustrating the logical arrangement of a system according to the invention. The signal waveform provided by modulating signal source 11 is reproduced on output terminal 12 following modulation and demodulation. A two-state device 13 provides a signal on output line 14 of instantaneous frequency proportional to the amplitude of the signal provided by modulating signal source 11. The feedback means 15 couples the output 14 of two-state device 13 to its input 16 to sustain oscillations. The two-state device 13 has the transfer characteristic represented therein. It provides as an output one of the signal amplitudes $E_1$ and $E_2$ and shifts to the other only when the input signal level progresses through both the threshold levels $e_1$ and $e_2$.

The separation between $e_1$ and $e_2$ is $w$, and the separation between $E_1$ and $E_2$ is $h$. The frequency of the oscillations depends upon circuit parameters, including $w$, $h$ and the parameters of the feedback means 15. The control signal on line 17 may vary one or more of these parameters to control the output frequency so that it is linearly related to the amplitude of the input modulating signal provided by source 11.

The control signal may be provided by a control feedback loop outside the oscillation-maintaining feedback loop. The output line 14 of two-state device 13 provides a signal that frequency demodulator 21 demodulates to provide a comparison signal corresponding closely to the modulating signal waveform provided by source 11. Combining means 22 combines the comparison signal from demodulator 21 with the modulating signal provided by source 11 to provide a difference signal representative of the difference between modulating and comparison signals. Amplifier 23 amplifies this difference signal to provide the control signal on line 17 that adjusts one or more of the oscillating loop frequency controlling parameters in a direction tending to reduce the magnitude of the difference signal and thereby cause the oscillating frequency to be linearly related to the modulating signal amplitude.

While demodulator 21 may be any known type, it preferably comprises means for providing a pulse of constant width and amplitude for each oscillation cycle and means for integrating the pulse train thereby provided. Such a demodulator requires no alignment and provides a comparison signal of amplitude linearly related to frequency so that as the difference signal amplitude approaches zero, the desired linear relationship between modulating signal amplitude and oscillation instantaneous frequency is established.

The output signal on line 14 may then be coupled to a filter 24, which may include power amplifying means, transmitting a selected frequency modulated harmonic to the radiator 25. Alternatively, the frequency modulated rectangular waveform on line 14 may be radiated directly. This direct radiation may be especially advantageous when the system is used for remote tranmission over short ranges, such as a wireless microphone system requires.

Receiving antenna 31 receives the radiated frequency modulated signal and provides a corresponding electrical signal to the R-F amplification stages 32. These stages may comprise a portion of a conventional receiver which provides a frequency modulated signal having a center frequency corresponding substantially to the free-running frequency, or a multiple thereof, of the two-state locked-in oscillator 33. The oscillator 33 may be of the type described in the Bose paper cited above. It has been discovered that such a two-state oscillator locks to a conventional frequency modulated signal of low amplitude in the presence of noise to provide an output signal that follows the signal frequency variations but is relatively insensitive to noise to provide a marked improvement in the detection of weak frequency modulated signals as compared to conventional discriminators preceded by limiting.

The output of locked-in two-state oscillator 33 is applied to frequency demodulator 34 which provides a reproduction of the modulating signal waveform on terminal 12. Frequency demodulator 34 preferably comprises means for providing a pulse of constant width and amplitude for each oscillation cycle of oscillator 33 and means for integrating the pulse train thereby provided. Such a demodulator reproduces the frequency modulation with negligible distortion and requires no alignment.

By applying another input signal on terminal 18 of combining means 19, the signal on output line 14 may bear an average value that corresponds to the amplitude of the signal applied to input terminal 18, which may be recovered by averaging means 20. The signal on output line 14 then has a frequency representative of the modulating signal provided by source 11 and an average value representative of the signal applied to terminal 18, each of which signals may be independent of one another. If such signals are respective components of a stereo signal, the signal on output line 14 may thus bear independently recoverable left and right components of a stereo signal in a manner which provides relatively high isolation between stereo channels.

Figure 2:
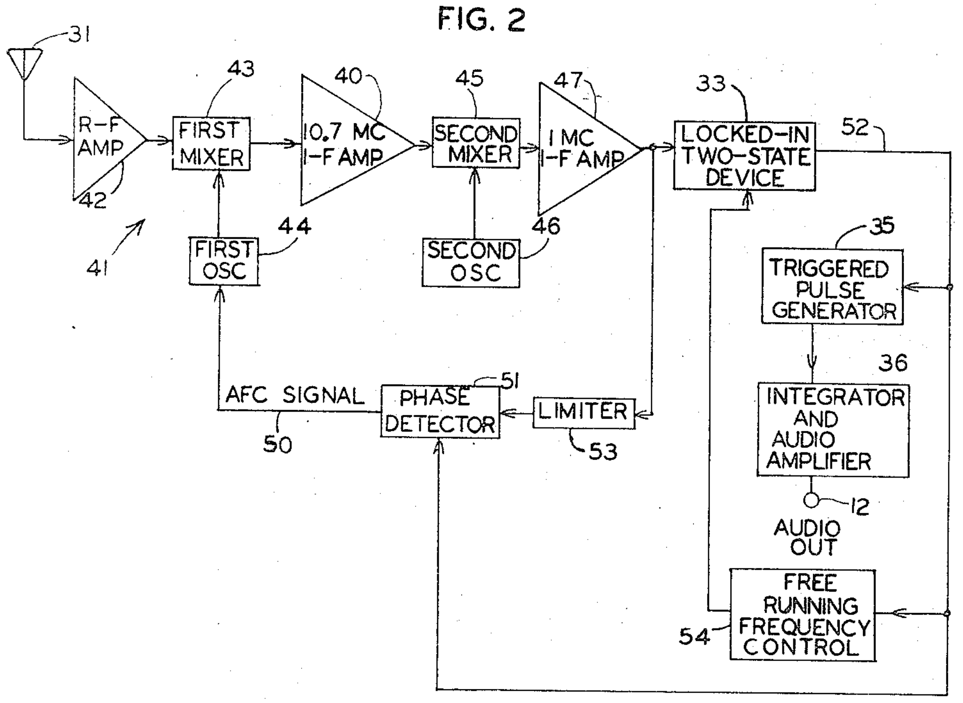
FIG. 2 is a block diagram illustrating the logical arrangement of a receiver according to the invention.

Referring to FIG. 2, there is shown a block diagram illustrating the logical arrangement of a preferred embodiment of a receiver according to the invention. The R-F amplification stages 32 may comprise a conventional F-M receiver front end 41 having a stage of R-F amplification 42 followed by a mixer 43 fed also by a first local oscillator 44 to provide a first intermediate frequency signal centered at 10.7 mc. This first intermediate frequency signal is amplified by first I-F amplifier 40 and then energizes a second mixer 45 fed also by a second local oscillator 46 of frequency fixed at 9.7 mc. to provide a second intermediate frequency signal centered at 1.0 mc. A second I-F amplifier 47 selectively amplifies the second intermediate frequency signal and delivers this amplified signal to two-state device 33, thereby locking its frequency.

The second I-F signal locks the frequency of locked-in two-state device 33 to a frequency corresponding to the instantaneous frequency of the received signal. The triggered pulse generator 35 and integrator 36 comprise frequency demodulator 34 which responds to the frequency variations of oscillator 33 by providing corresponding amplitude variations on output terminal 12.

Phase detector 51 responds to the phase difference of the rectangular waveform on output line 52 of two-state device 33 and the rectangular waveform on the output of limiter 53 to provide an AFC signal on its output line 50 that controls the frequency of first oscillator 44 with remarkable precision. This frequency control keeps the average of the instantaneous frequency provided by second mixer 45 always tracking the average free running frequency of the locked-in two-state device 33.

Another feature of the receiver of FIG. 2 resides in the provision of a free-running frequency controlling means 54 which responds to the signal on output line 52 to adjust the free-running frequency of locked-in two-state device 33 so that it corresponds very closely to the instantaneous frequency then provided by I-F amplifier 47. This technique makes the oscillator 33 especially sensitive to locking in on the desired signal, even for low signal/noise ratios.

Having briefly described the physical arrangement of the receiver of FIG. 2, its mode of operation will now be discussed. Antenna 31, R-F amplifier 42, first mixer 43, first oscillator 44, 10.7 megacycle I-F amplifier 40, second mixer 45, second oscillator 46 and 1 megacycle I-F amplifier 47 perform the known functions of a double conversion super-heterodyne receiver for converting an F-M signal in the 88–108 mc. first to 10.7 megacycles and then to 1 megacycle.

The apparatus effects automatic frequency control with exceptionally high precision. To this end the I-F signal provided by I-F amplifier 47 locks locked-in two-state device 33 to the second instantaneous intermediate frequency to provide a square wave of corresponding frequency on output line 52 that is applied to one input of phase detector 51. The output of the second I-F amplifier 47 is also applied to a limiter 53 which limits the second I-F frequency signal sufficiently to provide to the other input of phase detector 51 in effect a square wave of instantaneous frequency corresponding to the contemporary value of second I-F frequency signal. Phase detector 51 provides a signal on AFC line 54 that adjusts the frequency of first oscillator 44 so as to maintain substantial phase coincidence between the square wave signals on the inputs to phase detector 51. It is preferable that the delay furnished by limiter 53 is substantially equal to that furnished by locked-in two-state device 33. A feature of this AFC system is that the frequency of first oscillator 44, of the order of 100 megacycles, may be maintained to the frequency required to provide the desired station within 5 kilocycles, a stability without crystal control of 50 parts per million. Still another feature is that once a station has been acquired, the system locks to that station over a relatively wide variation of the manual tuning control. However, before actual lock-in occurs, the receiver acts almost as if there is no AFC so that it will lock on a weak signal adjacent to a much stronger signal.

Free-running frequency control 54 responds to the signal on line 52 by providing a control signal to locked-in two-state device 33 that maintains its free-running frequency, in the absence of a signal from I-F amplifier 47, very close to the contemporary instantaneous frequency provided by I-F amplifier 47. This control arrangement renders locked-in two-state device 33 very sensitive to being locked on the instantaneous signal frequency provided by I-F amplifier 47 while being insensitive to other instantaneous frequencies of noise components.

Figure 3:
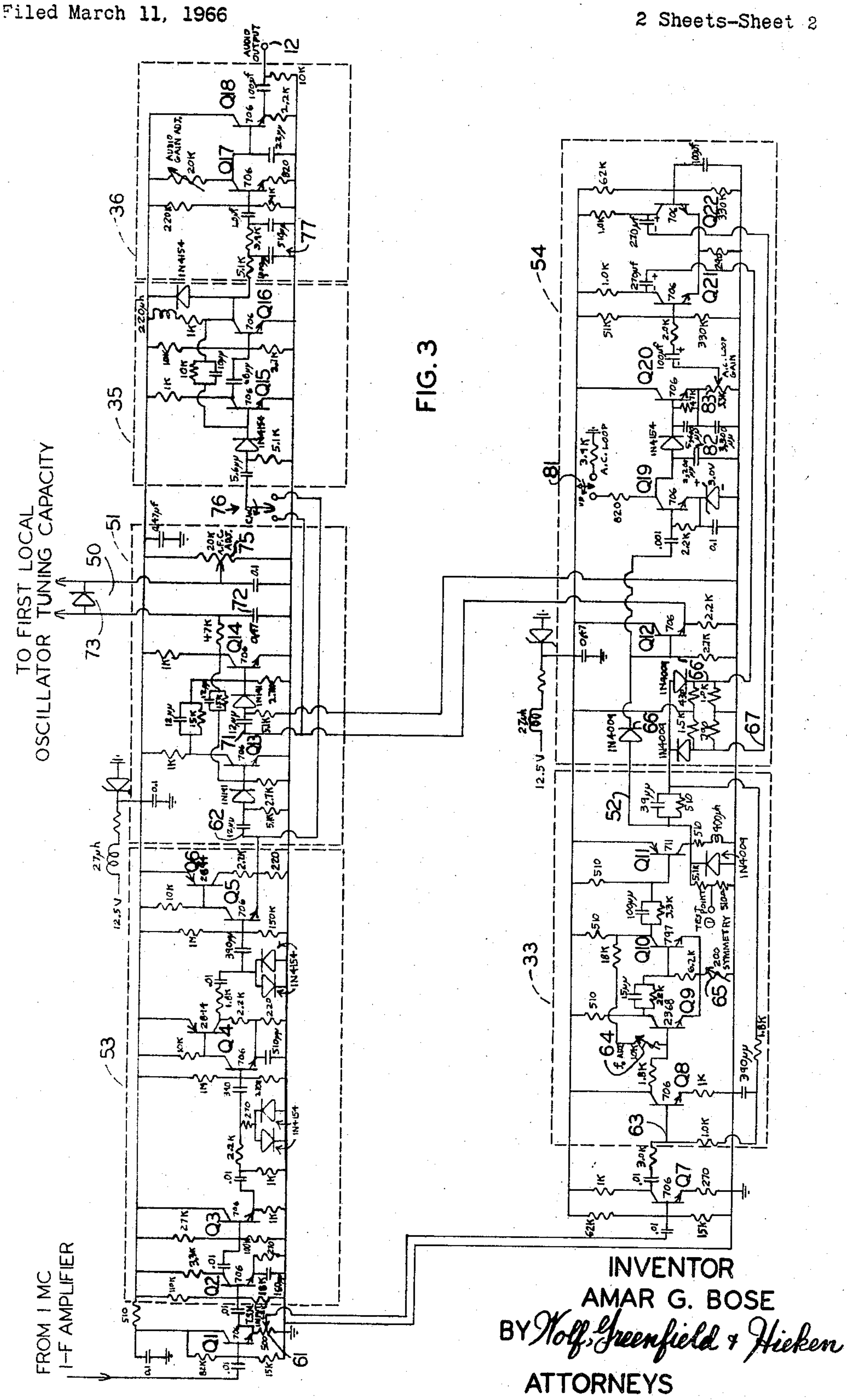
FIG. 3 is a schematic circuit diagram of portions of the receiver of FIG. 2.

Referring now to FIG. 3, there is shown a schematic circuit diagram of those portions of the receiver of FIG. 2 after I-F amplifier 47. Since the circuitry in the remaining blocks is conventional and well-known, such specific circuitry has been eliminated from FIG. 3 so as not to obscure the principles of the invention.

The output of I-F amplifier 47 is applied to transistor Q1 functioning as an emitter follower. Limiter 53 receives the second I-F signal directly from the emitter of transistor Q1. Locked-in two-state device 33 receives the second I-F signal from the arm of the emitter potentiometer 61. Transistors Q2, Q3, Q4, Q5 and Q6 and associated circuit components comprise a high gain limiter that provides a square wave on input 62 of phase detector 51. Since limiting circuitry is well known in the art and those skilled in the art may build an operative limiter by following the schematic circuit diagram in FIG. 3, further discussion of the limiter is not included. Transistor Q7 and associated circuitry comprise an amplification stage for coupling the arm of potentiometer 61 to the input 63 of two-state device 33.

Transistors Q8, Q9, Q10 and Q11 are associated circuitry comprise two-state device 33. A feedback signal coupled from output line 52 is combined on the base of transistor Q8 with the I-F signal provided on input 63 so that the switching of transistor Q8 between conductive and nonconductive states occurs at an instant of time dependent upon the combined signal formed by superimposing the second I-F signal from amplifier 47 on the feedback signal to thereby lock the frequency of two-state device 33 to that of the second I-F signal. Changes in the conductive state of transistor Q8 effect corresponding changes in the conductive states of transistors Q9, Q10 and Q11 to produce on line 52 a square wave of instantaneous frequency that corresponds to that of the second I-F frequency signal.

Potentiometer 64 functions to help control the nominal free-running frequency of two-state device 33 by controlling the feedback to the base of transistor Q9 to control the parameter W of two-state device 33; the smaller the resistance, the lower the free-running frequency. Symmetry potentiometer 65 effectively controls the base-emitter bias on transistors Q9 and Q10 so that the output wave is preferably a square wave at the free-running frequency.

Output line 52 is connected to the collector of transistor Q11. The collector load impedance circuitry of that transistor functions to provide pulses with relatively rapid rise times and relatively small overshoot.

Transistor Q12 functions as an emitter follower for providing a signal to the input 71 of phase detector 51 and to triggered pulse generator 35.

Phase detector 51 comprises transistors Q13 and Q14 with associated circuitry. Transistors Q13 and Q14 form a bistable circuit with inputs 62 and 71 comprising set and reset inputs, respectively. The stable condition occurs when the square wave provided by limiter 53 is precisely in phase opposition with the square wave provided on output line 52. That is, positive and negative going level shifts in the square wave provided by limiter 53 occur in substantial time coincidence with negative and positive going level changes, respectively, on output line 52. Thus, transistor Q13 is rendered conductive in response to a positive going level change on input 62 while a half period later transistor Q14 is rendered conductive by a positive going level change on input line 71 to provide a square wave. Integrating capacitor 72 averages this square wave to provide a control potential that keeps the effective capacity of frequency controlling unilaterally conducting device 73, which is connected across the tuning capacity of first oscillator 44, unchanged at a value determined by the setting of biasing potentiometer 75.

If, however, the positive going level change on line 71 occurs more than half a period after that on line 62, transistor Q14 is on for less than half a period so that its collector potential is positive for more than half a period, and the potential on capacitor 72 rises to increase the effective capacity across unilaterally conducting device 73 and change the frequency of local oscillator 44 so as to keep the center intermediate frequency provided by second I-F amplifier 47 essentially equal to the average free running frequency of the locked-in two-state device 33. Since unilaterally conducting device 73 is connected across the tuning capacity of first oscillator 44, the frequency control is effected in a known manner.

A switch 76 functions to connect the input of triggered pulse generator 35 to either limiter 53 or locked-in two-state device 33 in an embodiment of the invention arranged to permit comparison of the performance of a receiver employing the two-state device 33 and a receiver incorporating only the high performance limiter 53. When the arm of switch 76 is moved to the left, it is connected to two-state device 33; when connected to the right, it is connected to the output of limiter 53.

Transistors Q15 and Q16 comprise a triggered pulse generator that produces pulses of constant energy in response to each input pulse for integration by the integrating network 77 and amplification by the audio amplifier comprising transistors Q17 and Q18 to provide an audio signal on audio output terminal 12 that corresponds to the intelligence frequency modulated on the carrier signal received by antenna 31.

Considering now the free-running frequency control circuitry 54, transistor Q19, when the arm of switch 81 is moved to the left to activate this circuitry, functions as a sawtooth generator. Integrating capacitor 82 charges linearly and discharges in response to each positive pulse coupled through diode 66 from output line 52. The peaks of the sawtooth waveform on integrating capacitor 82 conform substantially to the modulation on the frequency modulated input signal. These peaks are detected and coupled by an emitter follower, comprising transistor Q20 having an A-C loop gain potentiometer 83, to the base of transistor Q21. Transistors Q21 and Q22 comprise a differential amplifier providing oppositely moving levels on lines 66' and 67 that establish maximum and minimum levels, respectively, of the feedback signal that is combined with the input signal on input line 63 to determine the exact instant when two-state device 33 switches. This control arrangement may be effectively thought of as controlling a parameter related to $h$ of the two-state device.

As stated above, this parameter $h$ determines the free-running frequency of two-state device 33 so that it is very close to the instantaneous frequency of the second I-F signal, thereby making it easy for the device to lock on the desired second I-F signal but difficult to lock on noise or other undesired signals. As the second I-F instantaneous signal frequency increases, the peak of the sawtooth waveform potential across capacitor 82 decreases and the difference in potential between lines 66 and 67 increases thereby increasing the free-running frequency of two-state device 33 so that it is ready to lock on the increased second I-F signal frequency. The reverse situation develops when the second I-F signal frequency decreases; that is, the peak of the sawtooth waveform potential across capacitor 82 increases and the magnitude of the parameter *h* decreases, thereby reducing the free-running frequency of two-state device 33. The result of using the free-running frequency control 54 then is that it functions to operate on present signal data to predict future desired signal data and enhance the detection of this future data. Ideally, free-running frequency control 54 introduces no phase shift at any modulation frequency of interest and transmits no spectral component of any switching frequency of interest. Linear intercoupling circuitry shown in FIG. 3 introduces sufficiently small delay when the highest spectral component of the modulating frequency is 100 cycles to effect an improvement of the order of 7 decibels in detection threshold as compared to having switch 76 positioned so that triggered pulse generator 35 is energized by limiter 53. Such a filter attenuates signals above 15 kilocycles considerably. Linear filters may be made having negligible phase shift in the audio frequency band up to 15 kilocycles and cutting off in amplitude sharply above that frequency provided that such filters have a peak in response at some much higher frequency that is well below the switching frequency.

Still another technique utilizing a nonlinear network to give weighted sensitivity to locking of the two-state device to a narrow frequency range surrounding the expected instantaneous frequency may be accomplished utilizing a pulse feedback of rectangular form and narrow duration so that it allows the input signal to combine with the feedback signal and effect switching only during a narrow time interval.

There has been described a novel communication system, including an exceptionally sensitive frequency modulation receiver, exceptionally linear frequency modulation transmitter and variations thereof. Numerous other modifications of and uses of the specific embodiments described herein may be practiced by those skilled in the art without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Electrical communication apparatus comprising, a first two-state device characterized by hysteresis having an area for switching between first and second output levels on its first device output at times related to the occurrence of predetermined values of a first device feedback signal, first device feedback means having gain, furnishing delay and responsive to the signal on said first device output for providing said first device feedback signal and coacting with said first two-state device to define a first device closed loop, a first modulating input for receiving a first modulating signal representable by spectral components of lower frequency than a first device rate at which said first device switches between said first and second output levels, means for coupling a control signal into said first device closed loop for altering at least one of said area, said gain and said delay to control said first device rate, first frequency demodulating means for providing a first device rate signal having an amplitude representative of the instantaneous value of said first device rate, and first combining means for combining said first modulating signal on said first modulating input with said first device rate signal to provide said control signal whereby said first device rate is representative of said first modulating signal.

2. Electrical communication apparatus in accordance with claim 1 and further comprising, a second modulating input for receiving a second modulating signal representable by spectral components of lower frequency than said first device rate, second combining means in said first device loop for combining said second modulating signal on said second modulating input with said feedback signal to provide a switching signal to said first two-state device that causes said two-state device to switch at insants of time so that the average value of the signal on said first device output is representative of said second modulating signal.

3. Electrical communication apparatus in accordance with claim 2 and further comprising, averaging means, means for coupling the signal on said first device output to said averaging means to provide an averaged signal representative of said second modulating signal, second frequency demodulating means for providing a second rate signal representative of said first device rate, and rate signal coupling means for coupling the signal on said first device output to said second frequency demodulating means whereby said second rate signal is representative of said first modulating signal.

4. Electrical communication apparatus in accordance with claim 3 wherein said second frequency demodulating means comprises, a second two-state device for switching between first and second signal levels on its second device output at times related to the occurrence of predetermined values of a second device feedback signal and characterized by a free-running frequency, second device feedback means responsive to the signal on said second device output for providing said second device feedback signal and coacting with said second two-state device to define a second device closed loop, rate sensitive means responsive to the signal on said second device output for providing said second rate signal which is representative of the instantaneous value of the second device rate at which said second device switches between said first and second signal levels, said rate signal coupling means including second device loop coupling means for coupling a rate variation signal representative of variations in said first rate into said second device loop to lock said second device rate to that of said rate variation signal whereby said second rate signal is representative of said first modulating signal, and means responsive to said second device rate for controlling said free-running frequency so that the latter frequency substantially follows the frequency of said rate variation signal.

5. Electrical communication apparatus in accordance with claim 4 wherein said rate signal coupling means comprises heterodyne receiving means for converting an input received signal having rate variations corresponding to those on said first device output into said rate variation signal having corresponding variations about a center I-F frequency corresponding substantially to said second device rate in the absence of said rate variation signal, said heterodyne receiving means including local oscillator means for providing at least one local oscillator signal of controllable frequency and mixing means for combining said local oscillator signal and said input received signal to provide said rate variation signal, means for limiting said rate variation signal to provide a limited rate variation signal, means for comparing said limited rate variation signal with the signal on said second device output to provide a frequency control signal, and means for coupling said frequency control signal to said local oscillator means to control said local oscillator frequency so as to keep said center I-F frequency constant.

6. Electrical communication apparatus in accordance with claim 5 and further comprising, means for providing a free-running control signal representative of the instantaneous second device rate, and means responsive to said free-running control signal for controlling said free-running frequency.

7. Electrical communication apparatus in accordance with claim 6 wherein said means for comparing comprises flip-flop means switched alternately in response to first one and then the other of said limited rate variation signal and the signal on said second device output to provide an output signal of rectangular waveform having an average value representative of the phase relationship between said limited rate variation signal and said signal on said second device output, and averaging means for averaging said output signal of rectangular waveform to provide said frequency control signal.

8. Electrical communication apparatus for recovering the modulation from a time base modulated input signal comprising, a two-state device for switching between first and second signal levels on its device output at times related to the occurrence of predetermined values of a device feedback signal and characterized by a free-running frequency, device feedback means responsive to the signal on said device output for providing said device feedback signal and coacting with said device to define a device closed loop for sustaining oscillations of the signal on said device output, rate sensitive means responsive to the signal on said device output for providing a demodulated signal whose amplitude is representative of the device rate of the signal on said device output, a signal input for receiving said time base modulated input signal, signal coupling means for coupling said time base modulated input signal into said device loop to lock said device rate to the time base modulation of said time based modulated input signal whereby said demodulated signal amplitude corresponds to said time base modulation, and means responsive to said device rate for controlling said free-running frequency so that the latter frequency corresponds substantially to that of said time base modulated input signal.

9. Electrical communication apparatus in accordance with claim 8 wherein said signal coupling means comprises heterodyne receiving means for converting said time base modulated input signal into an I-F signal having time base modulation and representable by spectral components centered about a center I-F frequency corresponding substantially to said device rate in the absence of said I-F signal, said heterodyne receiving means including local oscillator means for providing at least one local oscillator signal of controllable frequency and mixing means for combining said local oscillator signal and said time base modulated input signal to provide said I-F signal, means for limiting said I-F signal to provide a limited I-F signal, means for comparing said limited I-F signal with the signal on said device output to provide a frequency control signal, and means for coupling said frequency control signal to said local oscillator means to control said local oscillator frequency so as to keep said center I-F frequency constant.

10. Electrical communication apparatus in accordance with claim 9 and further comprising, means for providing a free-running control signal representative of the instantaneous device rate, and means responsive to said free-running control signal for controlling said free-running frequency.

11. Electrical communication apparatus in accordance with claim 9 wherein said means for comparing comprises flip-flop means switched alternately in response to first one and then the other of said limited I-F signal and the signal on said device output to provide an output signal of rectangular waveform having an average value representative of the phase relationship between said limited I-F signal and said signal on said device output, and averaging means for averaging said output signal of rectangular waveform to provide said frequency control signal.

12. Electrical communication apparatus comprising, heterodyne receiving means for converting an input signal into an I-F signal having a center I-F frequency, said heterodyne receiving means including local oscillator means for providing at least one local oscillator signal of controllable frequency and mixing means for combining said local oscillator signal and said input signal to provide said I-F signal, means for limiting said I-F signal to provide a limited I-F signal, means responsive to said I-F signal for providing a synchronized signal that tracks the frequency of said I-F signal, means for comparing said limited I-F signal with said synchronized signal to provide a frequency control signal, means for coupling said frequency control signal to said local oscillator means to control said local oscillator frequency so as to keep said center I-F frequency constant, said means for comparing comprising flip-flop means switched alternately in response to first one and the other of said limited I-F signal and said synchronized signal to provide an output signal of rectangular waveform having an average value representative of the phase relationship between said limited I-F signal and said synchronized signal, and averaging means for averaging said output signal of rectangular waveform to provide said frequency control signal.

References Cited

UNITED STATES PATENTS

| | | | |
|---|---|---|---|
| 2,465,782 | 3/1949 | Bartelink | 331—145 X |
| 3,001,068 | 9/1961 | Morita et al. | 325—346 |
| 3,152,306 | 10/1964 | Cooper et al. | 332—14 X |
| 3,204,195 | 8/1965 | Maestre | 331—10 |
| 3,289,096 | 11/1966 | Longuemare et al. | 332—16 |

ROBERT L. GRIFFIN, *Primary Examiner.*

B. D. SAFOUREK, *Assistant Examiner.*

U.S. Cl. X.R.

325—148, 346, 348; 332—14, 19